US008029738B2

(12) United States Patent
Abadie et al.

(10) Patent No.: US 8,029,738 B2
(45) **Date of Patent: *Oct. 4, 2011**

(54) METHOD AND DEVICE FOR REMOVING INFLAMMABLE GASES IN A CLOSED CHAMBER AND CHAMBER EQUIPPED WITH SUCH A DEVICE

(75) Inventors: Pascale Abadie, Fontenay-le-Fleury (FR); Herve Issard, Vanves (FR)

(73) Assignee: TN International, Montigny le Bretonneux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/683,297

(22) Filed: Jan. 6, 2010

(65) Prior Publication Data

US 2010/0104483 A1 Apr. 29, 2010

Related U.S. Application Data

(63) Continuation of application No. 11/659,909, filed on Feb. 8, 2007, now Pat. No. 7,655,201.

(30) Foreign Application Priority Data

Aug. 9, 2004 (FR) .................................... 04 51817

(51) Int. Cl.

| | |
|---|---|
| ***B01J 8/02*** | (2006.01) |
| *B01J 35/02* | (2006.01) |
| *B01J 19/00* | (2006.01) |
| *B01J 8/00* | (2006.01) |
| *B01J 8/04* | (2006.01) |
| *B01J 19/30* | (2006.01) |
| *G21C 1/00* | (2006.01) |
| *B01D 53/34* | (2006.01) |
| *G21F 9/00* | (2006.01) |
| *G21F 9/16* | (2006.01) |

(52) U.S. Cl. ........ 422/211; 422/129; 422/159; 422/168; 422/600; 422/603; 422/630; 422/631; 422/638; 422/644; 422/647; 588/1; 588/2

(58) Field of Classification Search .................. 422/159, 422/168, 211, 600, 603, 630, 631, 638, 644, 422/647, 129; 423/210, 247, 248; 588/1, 588/249, 2

See application file for complete search history.

(56) References Cited

U.S. PATENT DOCUMENTS

| | | | | |
|---|---|---|---|---|
| 3,179,487 A * | 4/1965 | Lehmer et al. | ................ | 423/210 |
| 4,686,068 A * | 8/1987 | Saida et al. | ........................ | 588/2 |
| 6,054,108 A * | 4/2000 | Eckardt et al. | ............. | 423/580.1 |

(Continued)

FOREIGN PATENT DOCUMENTS

DE 3730743 A1 * 3/1989

(Continued)

OTHER PUBLICATIONS

Machine translation of DE 3730743 A1, which was published Mar. 1989.*

*Primary Examiner* — Walter Griffin
*Assistant Examiner* — Natasha Young
(74) *Attorney, Agent, or Firm* — Nixon Peabody LLP

(57) ABSTRACT

Methods and devices for removing inflammable gases produced by radiolysis in a closed chamber containing radioactive matters comprising organic compounds and possibly water, or radioactive matters in the presence of organic compounds and possibly water. Inside the chamber there may be placed a catalyst of at least one reaction for oxidizing the inflammable gases by oxygen contained in the chamber atmosphere, supported by an inert solid support; a catalyst of at least the reaction for oxidizing CO to $CO_2$; possibly an oxygen source; and possibly a hygroscopic microporous inert solid support. Also, chambers for radioactive matters containing such devices.

20 Claims, 1 Drawing Sheet

U.S. PATENT DOCUMENTS

| | | | | |
|---|---|---|---|---|
| 6,625,248 | B2 * | 9/2003 | Mason et al. | 376/325 |
| 2004/0221632 | A1 * | 11/2004 | Doetsch et al. | 71/31 |

FOREIGN PATENT DOCUMENTS

| | | | | |
|---|---|---|---|---|
| DE | 19636557 | A1 | * | 3/1998 |
| EP | 383153 | A1 | * | 8/1990 |
| EP | 527416 | A2 | * | 2/1993 |
| EP | 660335 | A1 | * | 6/1995 |
| FR | 1476036 | A1 | * | 4/1967 |
| FR | 2061573 | A1 | * | 6/1971 |
| GB | 1306240 | A | * | 7/1970 |
| JP | 02287299 | A | * | 11/1990 |

* cited by examiner

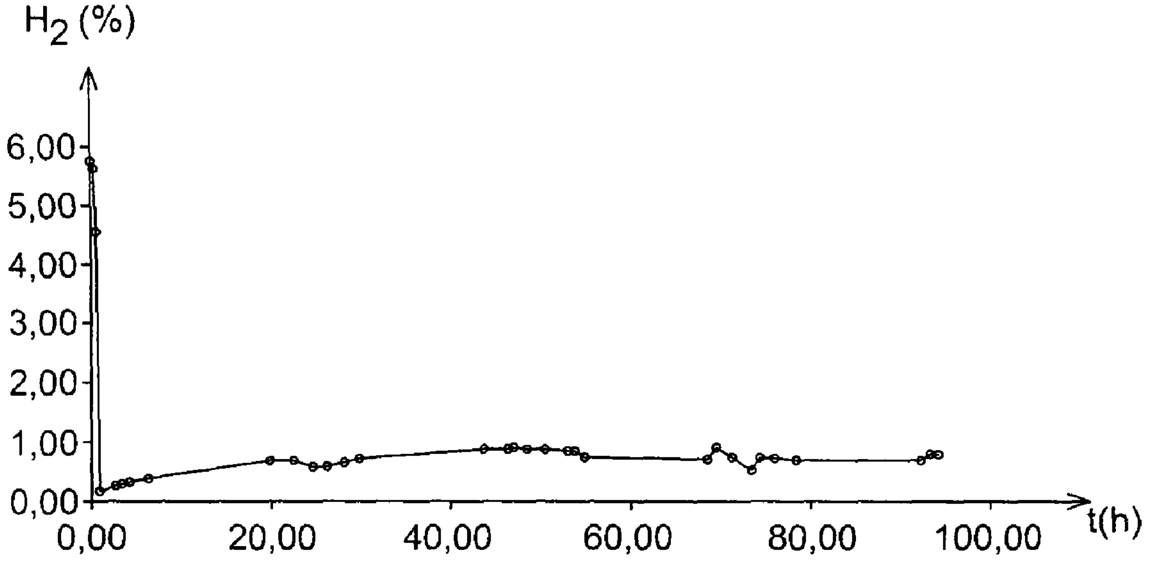
H2 (%)
6,00
5,00
4,00
3,00
2,00
1,00
0,00
0,00
20,00
40,00
60,00
80,00
100,00
t(h)

METHOD AND DEVICE FOR REMOVING INFLAMMABLE GASES IN A CLOSED CHAMBER AND CHAMBER EQUIPPED WITH SUCH A DEVICE

CROSS REFERENCE TO RELATED APPLICATIONS OR PRIORITY CLAIM

This application is a continuation of U.S. patent application Ser. No. 11/659,909, entitled "Method And Device For Removing Inflammable Gases In A Closed Chamber and Chamber Equipped With Such A Device," which is the national phase of International Application No. PCT/FR2005/050647, filed on Aug. 4, 2005 (not published in English), which claims priority to the French Patent Application No. 04 51817 filed Aug. 9, 2004.

TECHNICAL FIELD

The invention relates to a method and a device for removing inflammable gases, such as hydrogen, in a closed chamber containing radioactive matters, in the presence of solid or liquid organic compounds and possibly water capable of producing such gases, by radiolysis, or when the radioactive matters comprise compounds of this type and possibly water.

The invention further relates to a closed chamber such as a receptacle, tank or container suitable for transporting or storing radioactive matters in the presence of organic compounds and possibly water, or comprising components of this type, said chamber being equipped with such a device for removing inflammable gases.

The invention can be used in any closed chamber containing radioactive matters comprising organic compounds and possibly water, or radioactive matters in the presence of organic compounds and possibly water. As a non-limiting example, these radioactive matters may be technological waste from a facility for fabricating or reprocessing fuel elements for a nuclear reactor or issuing from such a reactor.

PRIOR ART

Nuclear installations such as facilities for fabricating fuel elements for nuclear reactors generate a certain quantity of scrap, called "technological waste". This technological waste may comprise a very wide variety of objects and materials such as motor parts, filters, scrap metal, rubble, glass, etc. This waste may also contain organic matter based on cellulose, such as paper, wood, cotton, or in the form of plastics such as packaging bags made of vinyl or polyurethane, boots, gloves, and miscellaneous objects made of polymer materials. All these wastes may also contain small quantities of liquids such as water and organic liquids (oils, hydrocarbons, etc.). All these wastes in themselves constitute radioactive materials, because they consist of metal parts activated during their residence in the installations, or organic or other materials contaminated by radioactive uranium or plutonium powder during their use in these installations.

Technological waste is periodically removed to reprocessing and disposal centres. Their conveyance to these sites accordingly demands as many precautions as the transport of any other radioactive matter. In particular, the waste must be packaged and transported in containers or casks meeting the requirements of the regulations on the transport of radioactive matters on the public thoroughfare.

In practice, transport is generally carried out by packing the technological waste in receptacles such as drums, bins or canisters, and by placing these receptacles in casks.

The transport of technological waste raises a specific difficulty associated with the type of material transported. In fact, as explained above, this waste often contains organic matters, solid or in the form of residual liquids, or else a certain quantity of water, contaminated by uranium or plutonium, imparting a radioactive character to these materials. In fact, uranium and plutonium are emitters of a particles, which have the specific property of dissociating organic molecules to release gaseous compounds such as carbon monoxide, carbon dioxide, oxygen and nitrogen, as well as inflammable gases. This mechanism, called "radiolysis", results in a dissociation of the molecules of the organic compounds containing carbon and hydrogen, like those comprised in plastics and hydrocarbons, or in a dissociation of the water molecules, with the production of hydrogen.

The production of inflammable gases and particularly of hydrogen by radiolysis mainly raises problems when the technological waste is confined in a closed chamber of relatively limited volume. In fact, the radiolysis gases are then released in a confined volume, so that a high concentration of inflammable gases may be reached rapidly if the type of waste and the radiation intensity causes a significant production of these gases.

The problem is particularly critical during transport, due to the fact that a large number of waste receptacles are generally placed in the same cask, in order to optimize transport capacity. In fact, this has the consequence of reducing the free space available in the cask for the inflammable gases which escape from the waste and the receptacles.

It may also be observed that waste containment receptacles often themselves present a certain tightness, because they are closed by crimped lids that can be provided with seals. In this case, the inflammable gases preferably accumulate in the residual free space existing within each of the receptacles. Since these volumes are also very small, this can lead to high concentrations of inflammable gases in the containment receptacles themselves.

In general, the inflammable gases produced by radiolysis form an explosive mixture when placed in the presence of other gases such as air, when their concentration exceeds a limit, called the "flammability limit". The flammability limit varies according to the type of inflammable gas and according to the temperature and pressure conditions. In the case of hydrogen, the flammability limit in air is about 4%. This means that, if the hydrogen concentration in the air exceeds this level, a heat source or spark can suffice to ignite the mixture or to produce a violent explosion in a confined space.

Various studies and observations have shown that the concentration of inflammable gases such as hydrogen, produced by radiolysis in a closed chamber containing radioactive matter comprising hydrogen-bearing components, can sometimes reach values of about 4% after a few days. This situation corresponds in particular to the case in which the technological waste emits intense a particles and contains numerous organic molecules.

In fact, it is common for a cask to remain closed for a much longer time before being opened. This incurs the risk of accident, because a spark caused by impact or friction may be produced during transport in the chamber of the cask or in a receptacle filled with waste. In this eventuality, the ignition or explosion is liable to extend to the entire contents of the cask, implying the risk of a serious accident on the public thoroughfare. A comparable risk exists if the cask falls into an accidental situation of fire during its transport. Furthermore, the risk of accident subsists during the final operations of opening the cask and unloading the receptacles, and during their eventual opening. In fact, these operations demand numerous handling operations, which are potentially dangerous. It is therefore particularly important to take account of the risk of accumulation of inflammable gases in any closed chamber used to contain radioactive matter comprising hydrogen-bearing compounds.

One technique for removing the inflammable gases such as hydrogen in a closed chamber such as a radioactive waste transport cask is essentially based on the introduction into the chamber of a catalyst for recombination of oxygen and hydrogen to water (or catalytic hydrogen recombiner), upon contact with which the hydrogen combines with the oxygen present in the air of the cavity to form water according to the catalytic hydrogen oxidation mechanism.

Devices putting this technique into practice are described for example in documents EP-A-0 383 153 and EP-A-0 660 335.

Document EP-A-0 383 153 describes a device for reducing the internal pressure in a radioactive waste storage receptacle. This device comprises a chamber placed in an opening of the wall or of the lid of the nuclear waste storage receptacle. The interior of this chamber receives a catalyst and comprises an opening communicating with the interior of the storage receptacle in which a sintered metal plug is placed. The catalyst is separated from the exterior by a metal fabric, a plate permeable to water vapour, or a lid of sintered metal.

The hydrogen formed in the storage receptacle passes through the sintered metal plug and reaches the catalyst where the hydrogen is oxidized to water by the oxygen in the air.

The catalyst used comprises a precious metal, for example palladium, on an inert support, for example alumina.

In this document, use is made of an external oxygen source comprising ambient air, which is only feasible for hermetically closed chambers of perfectly sealed transport casks.

Document EP-A-0 660 335 describes a device for reducing the overpressure in waste storage tanks, particularly radioactive waste producing hydrogen, in which a catalyst for recombination of hydrogen with oxygen and a desiccant are placed in a closed envelope placed inside the storage tank and communicating with its environment via a rupture disc.

Inside the envelope are provided two separation sheets permeable to water vapour, below which two layers of desiccant are placed.

In a first embodiment, two grids supporting the recombination catalyst are placed above the separation sheet.

In a second embodiment, a layer of oxidant is placed above the separation sheet, kept in place by a separation sheet permeable to the gases.

The desiccant is selected for example from silica gel, molecular sieves, dehydrated complexants such as for example copper sulphate or hygroscopic chemicals such as calcium chloride, magnesium sulphate, or phosphorus pentoxide, possibly on a support material.

The recombination catalyst is selected in particular from catalysts coated with platinum or palladium. In this device, the recombiner becomes inoperative once all the oxygen in the chamber has been consumed.

It has further been observed that these devices and methods, which use catalytic hydrogen recombiners, have the common feature of displaying lower efficiency particularly when the chamber contains carbon-bearing organic compounds.

Hence a need exists for a method and a device for removing the inflammable gases, and particularly hydrogen, in a closed chamber containing radioactive matter comprising organic compounds, regardless of the types of organic compound and their carbon content, and possibly water.

A need also exists for a method and a device for removing inflammable gases in a closed chamber, which serves to guarantee the removal of the inflammable gases, particularly of hydrogen over a long period, indeed a practically unlimited period.

A further need exists for a method and a device for removing inflammable gases in a closed chamber, which is simple, reliable, safe, easy to use, does not demand lengthy and costly procedures, and which guarantees the effective removal of the inflammable gases such as hydrogen in a wide variety of conditions, that is, inter alia:

- in the presence of other radiolysis gases such as oxides like carbon monoxide and carbon dioxide,
- under irradiation and regardless of the type and intensity of this radiation,
- at various temperatures, these temperatures possibly being negative.

It is an object of the invention to provide a method and a device which meet, inter alia, all the needs listed above.

It is a further object of the invention to provide a method and a device which do not present the drawbacks, limitations, defects and disadvantages of the methods and devices of the prior art and which provide a solution to the problems raised by the methods and devices of the prior art, such as those described in documents EP-A-0 383 153 and EP-A-0 660 335.

This object and others besides are achieved according to the invention, by a method for removing inflammable gases produced by radiolysis in a closed chamber containing radioactive matters comprising organic compounds and possibly water, or radioactive matters in the presence of organic compounds and possibly water, in which the following are placed inside the chamber:

a) a catalyst of at least one reaction for oxidizing the inflammable gases by oxygen contained in the chamber atmosphere, supported by an inert solid support, b) a catalyst of at least the reaction for oxidizing CO to $CO_2$.

The reaction of oxidation of the inflammable gases by the oxygen present in the chamber atmosphere is generally, and essentially, a reaction for oxidizing hydrogen to water.

Preferably, the catalyst a) is a catalyst of at least the reaction for oxidizing hydrogen to water.

The catalyst a) supported by an inert solid support is a first active product that permits the continuous removal of the inflammable gases and in particular of the hydrogen, produced by radiolysis of the molecules, organic compounds and possibly water inside the chamber.

This removal is achieved by the reaction for oxidizing the inflammable gases with the oxygen present in the chamber atmosphere, and particularly by the reaction of recombination of the hydrogen with the oxygen in the chamber atmosphere to produce water.

The catalyst a) of this oxidation reaction, which is supported by an inert solid support, can be a precious metal that is advantageously selected from the group consisting of platinum, palladium and rhodium.

The precious metal is present in a quantity that is generally lower than 0.1% by weight.

The catalyst a) of this oxidation reaction may also be a rare earth, selected advantageously from the lanthanide group, such as lanthanum.

The support of catalyst a) is an inert solid support.

Inert support means a support that does not react chemically with the compounds present in the chamber, the chamber atmosphere, and the other active products.

Preferably, the support of catalyst a) is a microporous inert solid support.

This microporous support is generally selected from possibly activated molecular sieves.

The term activated is a commonly used term in this technical field, which means that the compound forming the molecular sieve, such as alumina, has undergone treatment, particularly heat treatment, so as, in particular, to increase its specific surface area.

This molecular sieve is preferably made of a material selected from aluminas and activated aluminas.

The microporous inert solid support generally has a high specific surface area, that is a specific surface area generally of at least 200 $m^2/g$, and preferably of at least 300 $m^2/g$.

The catalyst b) is a second active product, it catalyses the reaction for oxidizing CO to $CO_2$. Preferably, the catalyst b) is a specific catalyst of the reaction of oxidizing CO to $CO_2$.

Specific means that the kinetics of oxidation of CO to $CO_2$ catalysed by b) is much higher than that catalysed by a).

Preferably, the catalyst b) comprises a mixture of manganese dioxide $MnO_2$ and copper oxide CuO.

The method according to the invention uses a combination of two active products, specific catalysts a) and b), which has never been described in the prior art as represented in particular by documents EP-A-0 383 153 and EP-A-0 660 335.

The method according to the invention, essentially due to the use of such a specific combination of active products, catalysts a) and b), meets the needs and requirements listed above and provides a solution to the problems raised by the methods of the prior art. In particular, the inventors have succeeded in demonstrating that the efficiency of the methods of the prior art is substantially reduced in the presence of other radiolysis gases such as carbon monoxide CO; this drop in efficiency is explained by a poisoning of the $H_2$ oxidation catalyst, a) such as palladium, by the carbon monoxide CO.

Accordingly, by combining the oxidation catalyst of the inflammable gases with a catalyst b) of the reaction of CO to $CO_2$, one surprisingly succeeds in preventing the poisoning of catalyst a) for oxidizing the inflammable gases by CO. The catalyst b) ensures the continuous removal of the carbon monoxide, by oxidation, to produce carbon dioxide, which causes no problem of poisoning of the catalyst a).

Nothing in the prior art tended to imply that the drop in efficiency of the catalyst basically resulted from the presence of CO in the chamber. The prior art contained no indication that would have led a person skilled in the art to associate with the catalyst a), such as a recombiner, commonly used in this technical field, a specific catalyst b).

The method according to the invention serves to remove effectively, over a very long period, indeed a virtually unlimited period, the inflammable gases such as hydrogen, present in the closed chamber. It preserves very high efficiency regardless of the waste present in the chamber and particularly if the waste contains organic compounds comprising carbon and hydrogen that are liable to liberate both CO and hydrogen. The method according to the invention operates perfectly in the presence of various radiolysis gases which, in addition to hydrogen, include for example CO, $CO_2$, etc.

The method according to the invention similarly operates perfectly in a broad range of temperatures and in particular at negative temperatures and under irradiation regardless of the nature thereof.

Optionally, in addition to the two catalysts a) and b) which are always present, an oxygen source c) is placed in the chamber. This oxygen source is an optional third active product that serves to contend with the lack of oxygen, once all the oxygen initially present in the chamber has been consumed.

This oxygen source may be in gaseous form or in solid form.

If the oxygen source is in solid form, it is generally selected from solid peroxides. These compounds release oxygen in the presence of water which, for example, is the water formed during the oxidation of hydrogen by the catalyst a). These solid peroxides are generally selected from peroxides of alkali and alkaline earth metals and mixtures thereof, such as calcium peroxide, barium peroxide, sodium peroxide, potassium peroxide, magnesium peroxide and mixtures thereof.

If the oxygen source is in gaseous form, it is generally formed by replacing all or part of the chamber atmosphere by pure oxygen.

Optionally, a hygroscopic microporous inert solid support d) is also placed in the chamber.

The hygroscopic microporous inert solid support is a fourth optional active product, which serves to ensure the continuous lowering of the moisture content of the chamber atmosphere, by adsorption of water. Depending on the temperature, the quantity of water removed generally represents 15% to 30% of the weight of the hygroscopic microporous support. The residual moisture in the chamber is thus maintained at a low value, for example less than 10% (moisture content) up to the saturation of said support. This serves in particular to collect the free water produced by the oxidation reaction, in particular the oxidation of hydrogen, catalysed by the catalyst a) and which would not have been absorbed in the micropores of the solid support, such as alumina, of the catalyst a), which can generally absorb up to 30% of its weight of water.

The hygroscopic microporous support is preferably selected from molecular sieves.

Advantageously, the molecular sieve of the microporous inert solid support d) is made of a material selected from materials of the aluminosilicate type (for example with the formula $Na_{12}$—$[(AlO_2)_{12}(SiO_2)_{12}]$ X $H_2O$, where X is up to 27, or 28.5% by weight of anhydrous product).

The hygroscopic microporous support generally has a high specific surface area, that is of at least 200 $m^2/g$, and preferably at least 300 $m^2/g$.

It should be observed that this fourth active product is particularly present if the third active product consists of a source of oxygen gas. In fact, in this case, the presence of water that has not been absorbed by the support of catalyst a) such as alumina, is not necessary to generate oxygen, as opposed to the case in which the oxygen source consists of a solid peroxide which liberates oxygen only in the presence of water.

Preferably, the microporous inert solid support supporting the catalyst a); the catalyst b); and possibly the oxygen source c) and the hygroscopic microporous support d) take the form of discrete elements, or particles, such as for example crystals, beads or granules, which may take the form of a powder.

Thus in a preferred embodiment of the invention, the inert solid, preferably microporous, support supporting the catalyst a); the catalyst b); and the hygroscopic microporous support d), if any, are fractionated into discrete elements, such as for example crystals, beads or granules, having an envelope diameter generally of between about 2 mm and about 20 mm.

The expression "envelope diameter" means the diameter of a fictitious sphere forming the envelope of said element.

The active product c) is advantageously in a finely divided form such as a powder.

In general, the active products a), b) and possibly c) and d) are placed, mixed or separately, in at least one receptacle that is at least partially permeable, such as a textile envelope, a strainer, a metal grid, or a perforated receptacle, such as a cartridge.

Preferably, the active products a) and b) are mixed.

On the other hand, the active products c) and d) must be separated.

It is possible, for example, to disperse each of the active products between two grids in the form of superimposed layers, or to form a single layer with a mixture of the two compulsory active products a) and b), each of the optional active products c) and d) being packaged separately, for example in the form of separate layers.

Several receptacles, such as cartridges, can be placed in the same closed chamber in order to increase the exchange area.

The mass ratio of catalyst b) to catalyst a) is generally from 1/1 to 1/10, and preferably from 1/2 to 1/4, this mass ratio generally being given for a ratio of generally about 1:11 of the CO flow rate to the $H_2$ flow rate.

The invention further relates to a device for removing inflammable gases produced by radiolysis in a closed chamber containing radioactive matters comprising organic compounds and possibly water, or radioactive matters in the presence of organic compounds and possibly water, comprising:

a) a catalyst of at least one reaction for oxidizing the inflammable gases by oxygen contained in the chamber atmosphere, supported by an inert solid support, b) a catalyst of at least the reaction for oxidizing CO to $CO_2$, possibly an oxygen source c);

possibly a hygroscopic microporous inert solid support d); a), b), c) and d) being such as defined above.

Finally, the invention further relates to a closed chamber, suitable for containing radioactive matters comprising organic compounds and possibly water, or radioactive matter in the presence of organic compounds and possibly water, capable of producing inflammable gases, by radiolysis, said chamber further containing at least one device for removing inflammable gases as defined previously.

The invention will be better understood from a reading of the detailed description that follows, provided for illustration and non-limiting, with reference to the drawings appended hereto in which:

FIG. 1 is a graph that shows the hydrogen content (% by volume), in the chamber, measured by chromatography, as a function of time (t in hours) during the test performed in the example.

BRIEF DESCRIPTION OF THE DRAWING

In the drawings:

FIG. 1 is a graph that shows the hydrogen content (percent by volume, measured by chromatography) as a function of time (hours) during a test in a chamber according to the present disclosure.

DETAILED DESCRIPTION OF THE INVENTION

The invention applies to any closed chamber, in which radioactive matters is placed comprising organic compounds and possibly water, or radioactive matters in the presence of organic compounds and possibly water.

Organic compound in the sense of the invention means a compound comprising at least one carbon atom, at least one hydrogen atom and possibly at least one other atom selected for example from atoms of nitrogen, sulphur, phosphorus, oxygen and halogens.

This chamber may have any shape and dimensions, as well as a more or less high level of tightness, without going beyond the scope of the invention. It may in particular be a receptacle such as a drum or a cylindrical or parallelepiped-shaped container. Furthermore, the chamber may be equally intended for transport, storage or the treatment of the radioactive matter concerned.

Furthermore, the radioactive matter placed in the closed chamber may consist of all radioactive materials comprising organic compounds and possibly water, or of all radioactive materials in the presence of organic compounds and possibly water.

In general, the invention applies more particularly to the case where said organic compounds are compounds which, in addition to hydrogen, emit or produce CO and $CO_2$, such as certain plastics. In fact, it has been demonstrated according to the invention that CO poisons the catalyst a) and could be removed effectively by the catalyst b) to preserve the efficiency of the catalyst a).

As a non-limiting example, the radioactive matter may consist of technological waste from a plant for the reprocessing or fabrication of nuclear fuel elements. As already stated, such waste is contaminated by radioactive plutonium or uranium and may contain a certain fraction of water or of solid or liquid organic compounds such as cellulose materials, plastics or hydrocarbons.

According to the invention, at least two active products are placed in the closed chamber containing the radioactive matter.

One of these active products, called below "active product A", is designed to remove, by continuous catalytic oxidation by the oxygen present in the chamber, the inflammable gases, such as hydrogen, produced by radiolysis in the chamber atmosphere, under the effect of the radiation emitted by the radioactive isotopes present in said materials.

The second active product, called below "active product B", is an active product designed to remove the carbon monoxide by continuous oxidation and form $CO_2$.

These two active products A and B may optionally be combined with one or two other active products.

These two other optional active products comprise a third product, called below "active product C", designed to provide a source of $O_2$, serving to contend with the lack of oxygen once all the oxygen initially present in the chamber has been consumed; and a fourth product, called below "active product D", consisting of an active product absorbing water.

The active product A comprises an inert solid support, preferably microporous, supporting a precious metal (impregnated with a precious metal), such as palladium, platinum or rhodium. As a variant, the inert solid support, preferably microporous, can also support a rare earth (be impregnated with a rare earth) advantageously selected from the lanthanide group, such as lanthanum.

The active product D consists of a hygroscopic microporous support.

The inert solid support of the active product A, if this support is microporous, and the hygroscopic microporous support of the optional active product D, generally both consist of a molecular sieve with a large developed surface area defined by a specific surface area, for example equal to or greater than 200, indeed 300 $m^2/g$.

Thus, if the microporous support of the active product A is impregnated with a precious metal or a rare earth, it has a very large reaction area for the oxidation of the inflammable gases produced by radiolysis in the chamber atmosphere and more particularly hydrogen.

In the active product A, the precious metal or rare earth is a catalyst of the reaction for continuous oxidation of the hydrogen, by the oxygen present in the chamber.

Generally, the presence of less than 0.1% by weight of precious metal in the microporous catalytic support serves to obtain the desired effect.

The preferred microporous inert support of active product A and the hygroscopic microporous support of the optional active product D generally consist, as stated above, of a molecular sieve preferably selected for the microporous support of the active product D from the group of aluminosilicates, with the formula $Na_{12}[(AlO_2)_{12}(SiO_2)_{12}]$ X $H_2$, where X can be up to 27, representing 28.5% of the anhydrous product, and for the microporous support of the active product A, from aluminas, preferably activated.

In the active product A, the high specific surface area of the preferred microporous support serves to maximize the catalysing action of the precious metal or the rare earth. In fact, a large reaction surface area is provided on a support material, by using very little catalytic compound and in reduced volumes.

Upon contacting the microporous inert support supporting the catalyst (impregnated with catalyst), the hydrogen combines with the oxygen in the chamber, to form water. The water thus formed is trapped and fixed deep in the micropores of the preferred support of product A, by molecular capillarity. By way of example, such a support can absorb up to 30% of its mass of water.

The excess water, not absorbed by the microporous support of the active product A, is possibly trapped in the micropores of the hygroscopic microporous support forming the active product D.

This makes it possible to prevent any formation of free water, which is liable to be decomposed again by radiolysis, by restoring a portion of the hydrogen removed. In fact, the water trapped deep in the microporous supports is less subject to the effects of the radiation emitted in the chamber atmosphere than if the water were free water. Alternatively, if the active product D is not present, the excess free water not absorbed by the support of the catalyst a) can then react with an active product C comprising a solid peroxide to cause a release of oxygen.

Furthermore, it should be observed that the oxidation method thus put into practice operates perfectly because the chamber atmosphere cannot reach a high moisture content. More precisely, the efficiency of the active product D serves to guarantee a relative humidity of less than about 10% in the chamber atmosphere. This ensures a maximum yield of the oxidation reactions using active products A and B.

The active product B, which must be placed inside the chamber, comprises a mixture of metal oxides, preferably in the form of granules, which allows the continuous removal of CO by oxidation to $CO_2$.

A preferred product comprises a mixture of manganese dioxide $MnO_2$ and copper oxide CuO.

The mixture of manganese dioxide $MnO_2$ and copper oxide CuO generally represents about 80% of the weight of the product B (generally about 66% of $MnO_2$ and 14% of CuO).

This active product B plays a particularly important role when the gases present in the chamber contain CO. In fact, and without wishing to be bound by any theory, it has accordingly been demonstrated that the active sites of the active product A are blocked by CO because the CO molecule is larger than the $H_2$ molecule. Hence it is the CO that is preferably converted by the catalyst a) and not the hydrogen. In other words, the hydrogen is not recombined because the CO blocks the active sites of the catalyst a).

If, in addition to the catalyst a), a catalyst b) is placed in the chamber, this permits a much faster oxidation of CO to $CO_2$ than the catalyst a). The active sites of the catalyst a) are then more available for the oxidation of the inflammable gases and particularly of hydrogen.

A catalyst that can be used as the active product B is the product sold under the name Carulite® by Zander. This is a mixture comprising CuO and $MnO_2$ which specifically catalyses the oxidation reaction of CO to $CO_2$.

For example, Carulite® catalyses this reaction at a rate that is ten times faster than the catalyst a), so that the catalyst a) remains available for the reaction for oxidizing the inflammable gases and in particular for the reaction for oxidizing hydrogen to water.

The mass ratio of the active product B to the active product A is generally from 1/1 to 1/10, and preferably from 1/2 to 1/4. This ratio is generally determined for a ratio of the CO flow rate to the $H_2$ flow rate that is generally about 1/11; this flow rate ratio is the one generally produced by technological waste.

The active product C, which is optional, is defined as being an oxygen source. This oxygen source is generally in gaseous form or in solid form.

In the latter case, it is generally a solid compound of the peroxide family which liberates oxygen in the presence of water. This water is generally the water formed during the oxidation of hydrogen by the catalyst a) and which has not been absorbed by the preferably microporous inert solid support of the catalyst a).

Accordingly, if the active product C is such a solid peroxide, it is preferable not to use active product D, so that the water remains available to react with the peroxide and liberate the oxygen.

The solid peroxide is generally selected from peroxides of alkali and alkaline earth metals such as peroxides of calcium, barium, sodium, potassium, magnesium and mixtures thereof.

The oxygen source in solid form is initially introduced into the chamber when an oxygen deficit is anticipated.

In order to be easily used and packed in the chamber, the active products A, B, C and D generally take the form of discrete elements or particles, such as granules, beads, crystals. Thus the microporous supports of the active products A, and possibly D, are advantageously fractionated into elements, particles, with small dimensions such as granules, beads or crystals.

More precisely, each of the elements of the microporous supports preferably has an envelope diameter of between about 2 mm and about 20 mm. Each of said elements of microporous supports one (is impregnated with one) precious metal in the case of the active product A. The active product B is generally already in a fractionated form for example, that is to say generally in the form of granules of oxides $MnO_2$ and CuO.

When it is present, the active product C, if it is a solid product, generally takes the form of a powder.

The fractionation of the microporous supports (active products A and D) and the already fractionated character of the active product B make it possible, optionally and as described more precisely below, to easily package at least one of the active products in various types of receptacle before placing them in the chamber. This fractionation also serves to maximize the efficiency of the properties of the microporous support, by further increasing the oxidation surface areas of the support of the active product A. In fact, when the hydrogen diffuses in the small elements forming the microporous catalytic supports, it is oxidized around the surfaces of all these elements. In other words, the total oxidation surface area corresponds to the sum of all the surface areas of the elements forming the support, which is much larger than the external surface area of the total volume occupied by said elements.

The same argument applies to the fractionation of the supports of the active product D, which increases the water absorption surface areas.

In consequence, the fractionation of the supports of the active product A and possibly D into small elements, the fractionated character of the active products B and C and the use of microporous materials with a high specific surface area combine to make the method according to the invention extremely efficient. The hydrogen is effectively oxidized on large surface areas, like the CO, and the water formed is trapped deep in the small elements, due to the capillarity properties of the microporous materials, particularly of the support material of the active product D.

In a preferred embodiment of the invention, the microporous support of the active products A is activated alumina $Al_2O_3$, in the form of small granules. Activated alumina $Al_2O_3$ is a substance with a high specific surface area, more than 200 $m^2$ per gram, indeed more than 300 $m^2/g$. To obtain the best results, the alumina granules have an envelope diameter of a few millimetres, preferably of between about 2 mm and about 20 mm. In the case of the support of the active product A, the granules are slightly impregnated with precious metal (less than 0.1% by weight) or rare earth.

Under these conditions, a quantity of granules impregnated with active product A corresponding to one liter by volume or about 800 g by weight, suffices to remove more than 400 liters of hydrogen in the free atmosphere of a closed chamber.

In a particular application relative to the transport of radioactive matters, these matters are generally packed in receptacles such as drums lashed inside the container or cask. The active products are then advantageously placed inside these receptacles. This serves to remove the hydrogen directly where it is produced. Only a very small fraction of the hydrogen accordingly escapes from the receptacles to diffuse in the free volume of the container, where it is removed by the active products, also placed in small quantities in this free volume.

If the receptacles are sealed, the active products can be placed in sufficient quantities exclusively inside these receptacles. In fact, the hydrogen concentration in the container atmosphere is then always insignificant because the hydrogen is removed in the receptacles and diffuses very little into the chamber of the container.

It should be observed that the introduction of the active products into the receptacles serves to continue to prevent the accumulation of hydrogen after their final unloading. Moreover, if the receptacles are intended for storage on site for a long period, the active products can possibly be replenished to ensure the removal of hydrogen continuously on the storage site. In other words, the use of the method according to the invention is not limited to the removal of inflammable gases produced in a closed chamber during transport.

In conclusion, the method according to the invention is particularly simple to use in combination with chambers of different types containing radioactive matter comprising organic components and possibly water. The handling operations necessary for placing the active products in the chamber are particularly simple and rapid to perform. The removal of the inflammable gases produced by radiolysis in the chamber is effectively guaranteed. Furthermore, the transport and storage times can be controlled very flexibly because it suffices to introduce appropriate quantities of active products into the chamber for the anticipated transport and/or storage period.

The invention will now be described with reference to the following example, provided for illustration and non-limiting.

EXAMPLE

This example illustrates the method of the invention using the following active products a) and b):

active product a): alumina (microporous inert solid support) impregnated with palladium (catalyst) in the form of 3 mm beads and having a specific surface area of 300 $m^2/g$;

active product b): granules with the following chemical composition: 65% $MnO_2$, 13% CuO, 9% $Al_2O_3$ and about 10% $H_2O$. The granules are between 1 and 2 mm in size.

The test was performed without active products c) and d).

The test was performed as follows:

A quantity of 25 grams of active product a) described above and a quantity of 12.5 g of active product b) described above (the products are packaged separately) were placed in a 20 liter chamber (Tedlar bag) containing 600 ml of hydrogen and 53 ml of carbon monoxide. The initial hydrogen concentration was about 5.6%.

An $H_2$/CO mixture was injected continuously with the following flow rates: 5.6 ml/h for carbon monoxide and 65 ml/h for hydrogen, representing an $H_2$/CO flow rate ratio of 11.6.

This ratio was representative of the ratio of flow rates of $H_2$ and CO generated in a cask containing compacted waste produced by spent fuel reprocessing (of which the average composition was 90% of hulls and end-fittings and 10% of technological waste); the hydrogen and carbon monoxide flow rates were 2 liters/hour and 0.18 liters/hour, respectively.

The test lasted 95 hours (up to the exhaustion of the oxygen present in the chamber). The hydrogen content in the chamber was measured throughout the test by chromatography. This content remained lower than 1% (by volume) throughout the test, as shown by the curve of the $H_2$ content as a function of time (hours) shown in FIG. 1.

The invention claimed is:

1. Device for removing flammable gases produced by radiolysis in a closed chamber which is a receptacle, tank or container, suitable for transporting and/or storing radioactive matters, said closed chamber containing radioactive matters comprising solid or liquid organic compounds and possibly water, or radioactive matters in the presence of solid or liquid organic compounds and possibly water, comprising:

a) a first catalyst of at least one reaction for oxidizing the flammable gases by oxygen contained in the chamber atmosphere, supported by a hygroscopic, microporous, inert solid support, and b) a second catalyst of at least the reaction for oxidizing CO to $CO_2$.

2. The device according to claim 1, wherein the first catalyst is a catalyst of at least the reaction for oxidizing hydrogen to water.

3. The device according to claim 1, wherein the first catalyst is a rare earth metal, selected from the lanthanide group.

4. The device according to claim 1, wherein the first catalyst is a precious metal selected form the group consisting of platinum, palladium, and rhodium.

5. The device according to claim 4, wherein the inner solid support of the first catalyst supports less than 0.1% by weight of precious metal.

6. The device according to claim 1, wherein the inert solid support is selected from molecular sieves, possibly activated.

7. The device according to claim 6, wherein the molecular sieve comprises a material selected from aluminas and activated aluminas.

8. The device according to claim 1, wherein the inert solid support has a specific surface area of at least 200 $m^2/g$.

9. The device according to claim 1, wherein the second catalyst comprises a mixture of manganese dioxide ($MnO_2$) and copper oxide (CuO).

10. The device according to claim 1, wherein the mass ratio of second catalyst to first catalyst is from 1:1 to 1:10.

11. The device according to claim 1, further comprising an oxygen source.

12. The device according to claim 11, wherein the oxygen source is selected from solid peroxides.

13. A closed chamber, which is a receptacle, tank or container, suitable for transporting and/or storing radioactive matters, said closed chamber being capable of containing radioactive matters comprising solid or liquid organic compounds and possibly water, or radioactive matters in the presence of solid or liquid organic compounds and possibly water, capable of producing flammable gases, by radiolysis, said chamber further containing at least one device for removing inflammable gases as defined in claim 1.

14. The device according to claim 1, wherein the microporous, inert solid support is sufficiently hygroscopic that it can absorb about 30% of its mass of water.

15. Device for removing flammable gases produced by radiolysis in a closed chamber which is a receptacle, tank or container, suitable for transporting and/or storing radioactive matters, said closed chamber containing radioactive matters comprising solid or liquid organic compounds and possibly water, or radioactive matters in the presence of solid or liquid organic compounds and possibly water, comprising:

a) a first catalyst of at least one reaction for oxidizing the flammable gases by oxygen contained in the chamber atmosphere, supported by an inert solid support, and b) a second catalyst of at least the reaction for oxidizing CO to $CO_2$;and c) a hygroscopic microporous support within the chamber.

16. The device according to claim 15, wherein the inert solid support is hygroscopic and microporous, and wherein the inert solid support supporting the first catalyst, the second catalyst, and the hygroscopic microporous support are fractionated into discrete elements.

17. The device according to claim 16, wherein the discrete elements have an envelope diameter of between about 2 mm and about 20 mm.

18. The device according to claim 17, further comprising an oxygen source, wherein at least one of the first catalyst, the second catalyst, the oxygen source, and the hygroscopic microporous support is placed, mixed or separately, in at least one receptacle that is at least partially permeable.

19. The device according to claim 15, wherein the hygroscopic microporous support is capable of absorbing between about 15% and about 30% of its mass of water.

20. A closed chamber, which is a receptacle, tank or container, suitable for transporting and/or storing radioactive matters, said closed chamber being capable of containing radioactive matters comprising solid or liquid organic compounds and possibly water, or radioactive matters in the presence of solid or liquid organic compounds and possibly water, capable of producing flammable gases, by radiolysis, said chamber further containing at least one device for removing inflammable gases as defined in claim 15.

* * * * *